US006063998A

United States Patent [19]

Rolf et al.

[11] Patent Number: 6,063,998

[45] Date of Patent: May 16, 2000

[54] CABLE HEAD OF A HIGH-CURRENT MULTIPLE CABLE FOR DIRECT-CURRENT APPLICATIONS

[75] Inventors: Thomas Rolf; Christof Dratner, both of Osnabrück, Germany

[73] Assignee: KM Europa Metal AG, Osnabrück, Germany

[21] Appl. No.: 09/107,214

[22] Filed: Jun. 30, 1998

[30] Foreign Application Priority Data

Jul. 4, 1997 [DE] Germany ............................ 197 28 559

[51] Int. Cl.$^{7}$ ...................................................... H02G 15/20

[52] U.S. Cl. ........................ 174/15.6; 174/15.7; 174/74 R

[58] Field of Search .................................. 174/15.6, 15.7, 174/19, 47, 15.1, 74 R; 219/136

[56] References Cited

FOREIGN PATENT DOCUMENTS 23 41 900 C3 2/1975 Germany .

*Primary Examiner*—Kristine Kincaid
*Assistant Examiner*—Chau N. Nguyen
*Attorney, Agent, or Firm*—Kenyon & Kenyon

[57] ABSTRACT

A cable head, in which ends of cable cores, made of a plurality of individual stranded conductors, are inserted into the bore holes of a cable lug. The cable cores are fixed in position in the bore holes by radial pressing and deformation of the bore holes. The bore holes are located on divided circles which are concentric relative to each other, the bore holes on the inner divided circle being staggered with respect to the bore holes on the outer divided circle. Cooling-water grooves between the bore holes located on the outer divided circle extend, with a depth, into the proximity of the bore holes arranged on the inner divided circle. They are connected to a central cooling-water channel in the cable head.

4 Claims, 2 Drawing Sheets

CABLE HEAD OF A HIGH-CURRENT MULTIPLE CABLE FOR DIRECT-CURRENT APPLICATIONS

BACKGROUND OF THE INVENTION

This invention relates to a cable head of a high-current multiple cable for use in direct-current applications, in which the ends of the cable cores, made of a plurality of individual stranded conductors, are inserted into bore holes extending concentrically with respect to the axis of a cylindrical section of a cable lug. The cylindrical section is sheathed by an outer tube; the cables are fixed in position in the bore holes by radial pressing, deforming the bore holes. A central cooling-water channel is provided in the center of the cable lug, and cooling-water grooves are provided on the peripheral side of the cylindrical section that are connected to the cooling-water channel.

This general type of cable head is known from the German patent 23 41 900 C3. In that patent, the bore holes accommodating the ends of the cable cores are located along a single divided circle. This results in a large diameter outer tube, which means the bending radius of a high-current multiple cable must be kept comparatively large during use, for example, for a direct-current oven. Thus, a large bending radius leads inevitably to larger space requirements for the high-current multiple cable.

There remains a need for a cable head of a high-current multiple cable for direct-current applications, which is dimensioned to be spatially smaller than devices of the aforementioned type, thereby permitting more favorable laying possibilities of a direct-current multiple cable.

SUMMARY OF THE INVENTION

The present invention meets this need by providing that the bore holes be located along concentric, divided circles. The bore holes on the inner divided circle are staggered with respect to the bore holes on the outer divided circle. The depth of the cooling-water grooves between the bore holes located on the outer divided circle extend into the proximity of the bore holes arranged on the inner divided circle.

Thus, the invention distributes the bore holes (and thus also the ends of the cable cores) over the entire cross-section of the cylindrical section of the cable lug. This distribution makes it possible to keep the diameter of the cable head smaller, compared to prior art approaches. Because the diameter of the cable head is smaller, the diameter of the outer tube can also be made smaller, with a smaller bending radius. Consequently, the use of a high-current multiple cable, furnished with a cable head designed in this manner, leads to significant savings in space on account of the smaller bending radius. An example of a use to which this design can be put is in designing a new or retrofitting an existing direct-current oven, in which the reduced bending radius leads to noticeable space savings. From this, it follows that the cable length can also be reduced.

When employed on existing direct-current ovens and the pre-existing cable length is maintained, a longer service life of the cable results, since the forces acting on the cable due to bending are reduced. Alternatively, a shortening of the cable length would lead to a savings in weight.

In all application cases, both the reduction in the diameter of the outer tube and the smaller cable head also lead to a reduction in weight.

Because the depth of the cooling-water grooves extends between the bore holes located on the outer divided circle into the proximity of the bore holes arranged on the inner divided circle, the radial pressing of the ends of the cable cores in the bore holes located on the inner divided circle can be performed in a well-directed manner via the bottoms of the cooling-water grooves. In this manner, a uniform pressure distribution is attainable on each cable core during the radial pressing, since it is possible to adhere to nearly identical rim thicknesses for all bore holes distributed over the cross-section.

BRIEF DESCRIPTION OF THE FIGURES

The invention is explained more precisely by reference to the exemplary embodiment shown in the drawings, in which.

DETAILED DESCRIPTION

Figure 1:
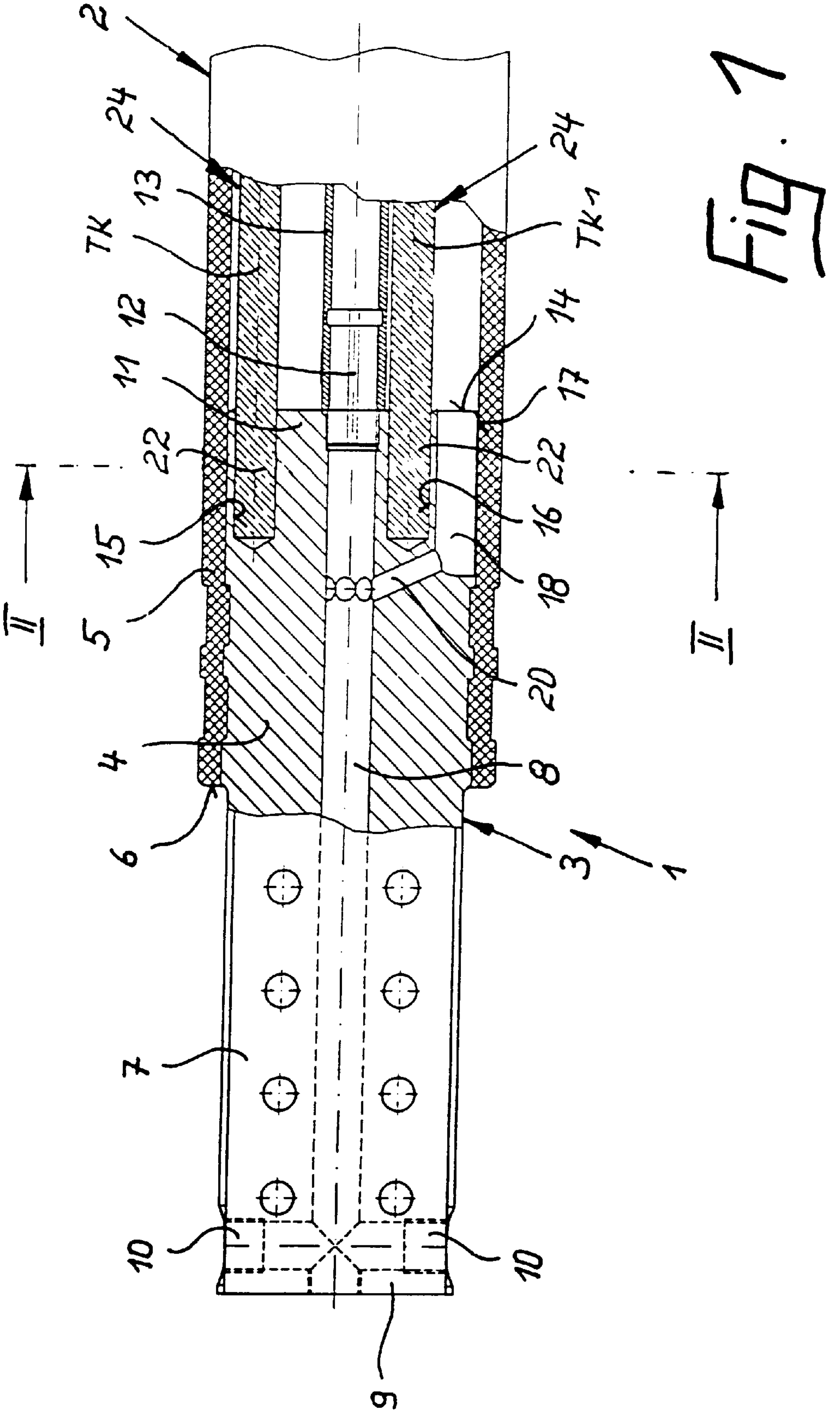
FIG. 1 is a longitudinally extending cross-sectional view of the cable head of a high-current multiple cable constructed according to the principles of the invention.

In FIG. 1, the cable head of a high-current multiple cable 2 for direct-current applications is designated by reference numeral 1.

Cable head 1 includes a cable lug 3 made of copper or the like, which, along a cylindrical section 4, is fixed in position in an outer tube 5. The tongue-like part 7 of cable lug 3, protruding beyond end face 6 of outer tube 5, is used for providing a connection to a conductor or load.

A cooling-water channel 8 passes centrally through cable lug 3 and has transversely directed connections 10 at free end 9 of cable lug 3. Located at inner end 11 of cable lug 3 is a restrictor 12, providing a junction to a cooling-water line 13 penetrating high-current multiple cable 2.

Figure 2:
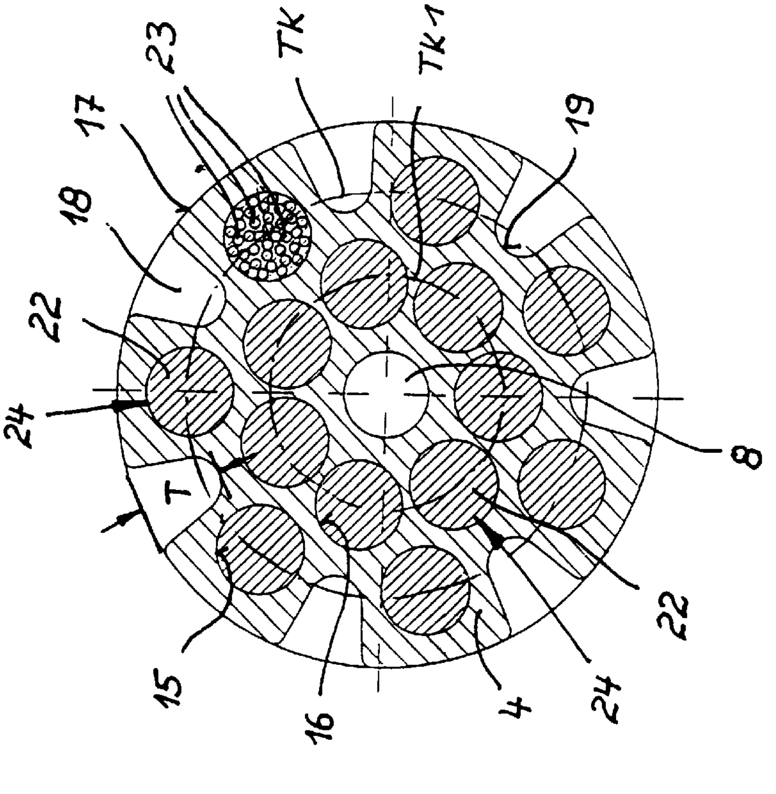
FIG. 2 is cross-sectional view of the cable head of FIG. 1, taken along line II—II during an intermediate stage of assembly, prior to radial crimping.

From end face 14 of cylindrical section 4 of cable lug 3, bore holes 15 and 16 are introduced as blind-end bores on two divided circles TK and TK1 lying concentrically relative to each other (FIGS. 1 and 2). Seven bore holes 15 and 16 are located on each divided circle TK and TK1. Bore holes 16 located on inner divided circle TK1 are staggered with respect to bore holes 15 arranged on outer divided circle TK.

Between bore holes 15 located on outer divided circle TK, approximately V-shaped cooling-water grooves 18, having a depth T, extend from outer peripheral area 17 of cylindrical section 4, into the proximity of bore holes 16 located on inner divided circle TK1. Groove bottoms 19 are rounded. Cooling-water grooves 18 run from end face 14 of cylindrical section 4 over a length that is somewhat longer than the length of bore holes 15 and 16. The inner ends of cooling-water grooves 18 are connected via slanting channels 20 to the central cooling-water channel 8 extending along axis 21 of cable lug 2.

Figure 3:
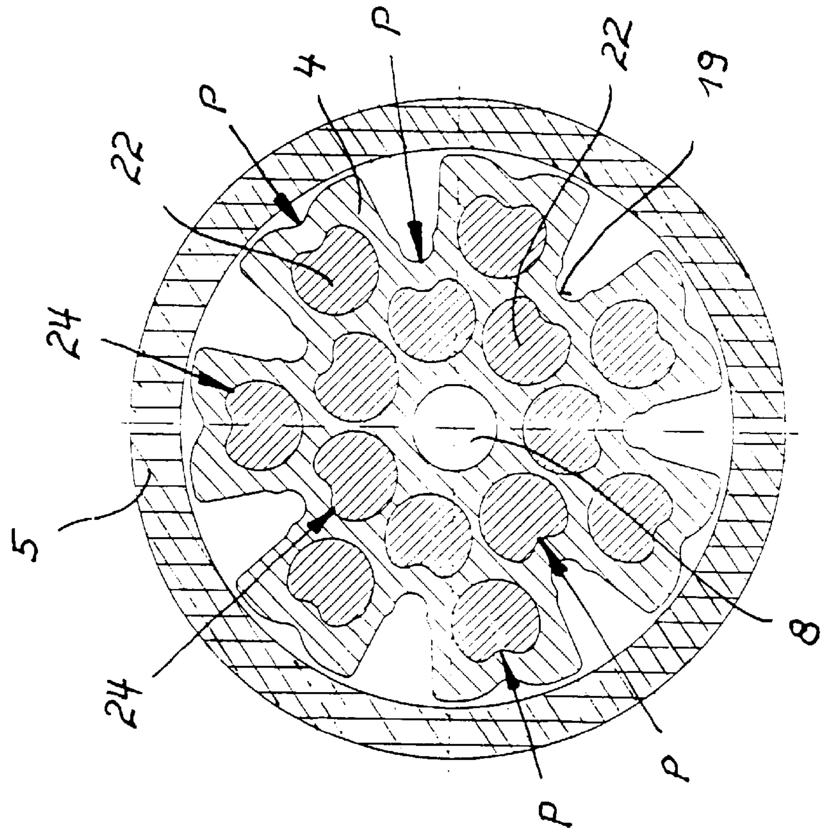
FIG. 3 is a cross-sectional view of the completed cable head shown in FIGS. 1 and 2, taken along the line II—II.

Bore holes 15 and 16 are used to receive and fix in position the ends 22 of cable cores 24, which are each made of a plurality of individual stranded conductors 23. As FIG. 3 shows, ends 22 are fixed in bore holes 15 and 16 by a radial pressing (P) of the material of cylindrical section 4, as well as of ends 22. In so doing, ends 22 located on outer divided circle TK are pressed radially inwardly from peripheral area 17, while ends 22 located on inner divided circle TK1 are pressed radially from groove bottoms 19.

What is claimed is:

1. A cable head of a high-current multiple cable for direct-current applications, comprising:

A. a cable lug having i. a longitudinally extending axis of symmetry;

ii. a central, axially extending cooling water channel;

iii. a cylindrical section, the cylindrical section having a plurality of longitudinally directed cooling-water grooves of depth T that are located on the periphery of the cylindrical section and which are connected to the central water cooling channel;

iv. a plurality of axially extending bore holes penetrating the cylindrical section for receiving ends of a plurality of cable cores, each made of a plurality of individual stranded conductors, wherein the bore holes are located along concentric divided circles, one inside the other, and the bore holes located on the inner divided circle are staggered with respect to the bore holes located on the outer divided circle, and wherein the cooling-water grooves on the periphery of the cylinder section are located between the bore holes of the outer divided circle and extend a depth sufficient to bring bottoms of the grooves into proximity with the bore holes of the inner divided circle; and B. an outer tube sheathing the cylindrical section and serving to fix the ends of the cable core into position within the bore holes via radial pressing so as to radially deform the bore holes and thereby crimp the ends of the cable core into place.

2. A cable head as set forth in claim 1, wherein the cooling water grooves are connected to the central cooling water channel via at least one slanted channel.

3. A cable head as set forth in claim 1, wherein the number of bore holes on the inner divided circle is equal to the number of bore holes located on the outer divided circle.

4. A cable head as set forth in claim 1, wherein the number of bore holes on the inner divided circle is 7 and the number of bore holes on the outer divided circle is 7.

* * * * *

UNITED STATES PATENT AND TRADEMARK OFFICE

CERTIFICATE OF CORRECTION

PATENT NO. : 6,063,998
DATED : May 16, 2000
INVENTOR(S) : Thomas ROLF and Christof DRATNER It is certified that error appears in the above-identified patent and that said Letters Patent is hereby corrected as shown below:

Column 3, line 21, change "cylinder" to -- cylindrical --.

Column 4, line 1, change "a depth" to -- said depth T --.

Column 4, line 10, change "core" to -- cores --.

Signed and Sealed this

Seventeenth Day of April, 2001

Attest:

Nicholas P. Godici

NICHOLAS P. GODICI

*Attesting Officer* *Acting Director of the United States Patent and Trademark Office*